Sept. 15, 1953
E. T. ABLE
2,651,935
TORQUE INDICATOR FOR TORQUE WRENCHES
Filed Oct. 12, 1951
2 Sheets-Sheet 2
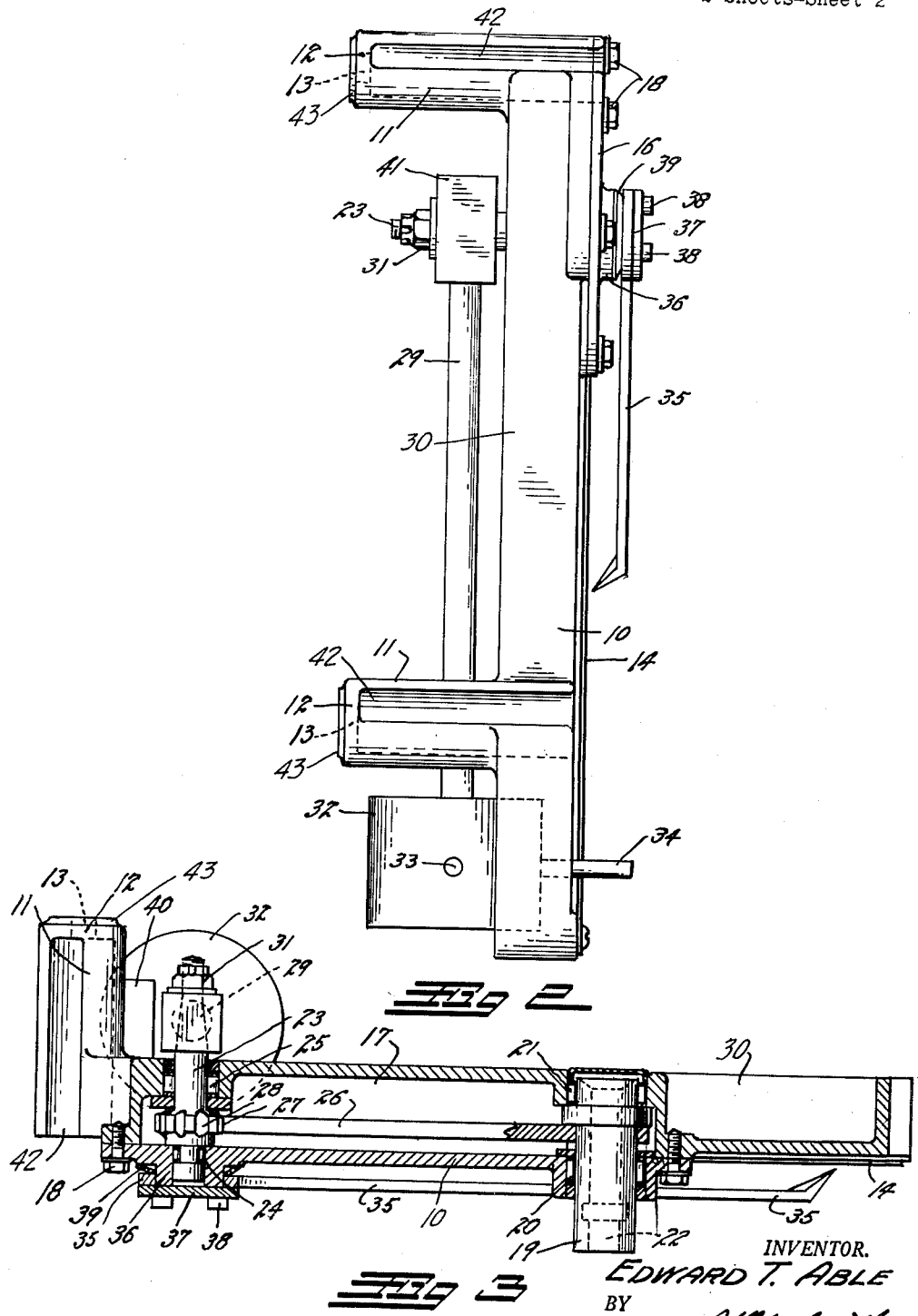
INVENTOR.
EDWARD T. ABLE
BY
ATTORNEY Patented Sept. 15, 1953

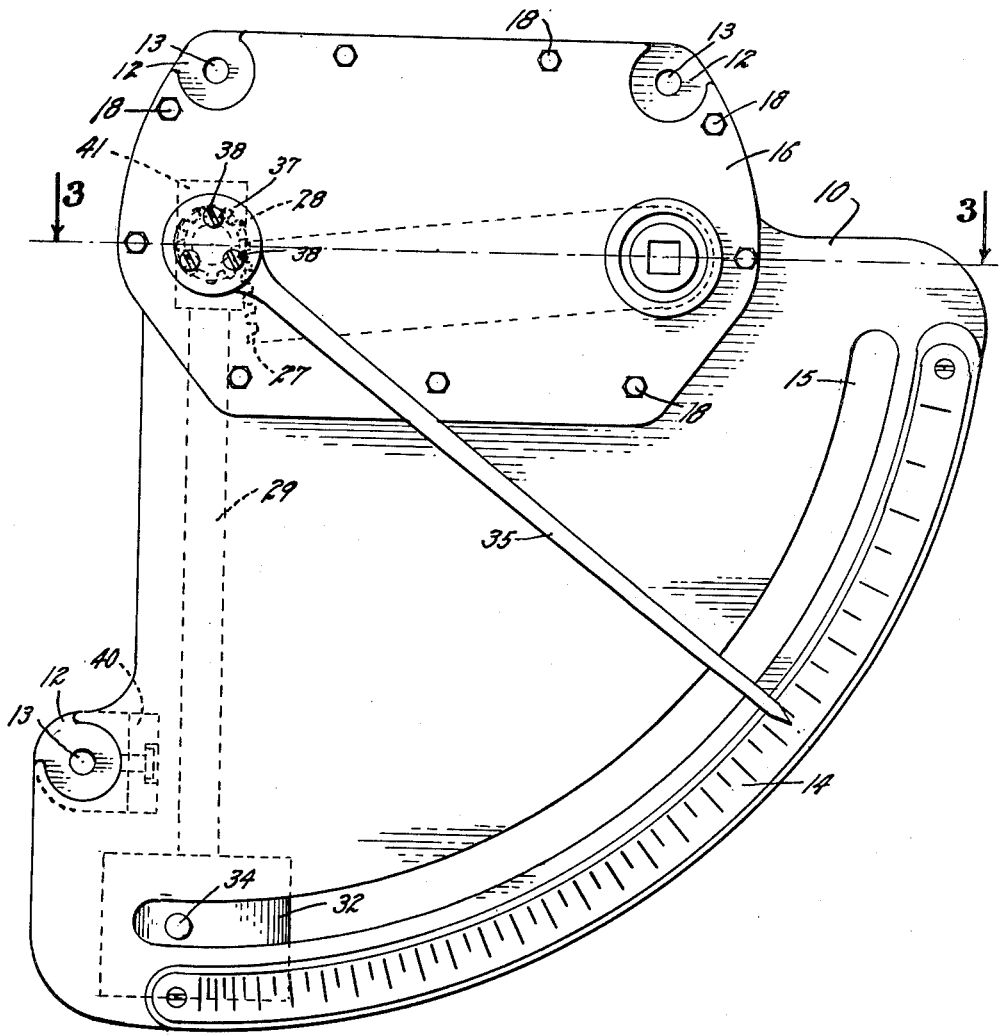

2,651,935

UNITED STATES PATENT OFFICE 2,651,935

TORQUE INDICATOR FOR TORQUE WRENCHES

Edward Thorne Able, Denver, Colo., assignor to B. K. Sweeney Mfg. Co., Denver, Colo., a corporation of Colorado Application October 12, 1951, Serial No. 251,001

4 Claims. (Cl. 73—1)

This invention relates to a torque wrench-testing device. Torque wrenches are designed to tighten nuts, screws, and bolts to a predetermined tightness or stress. The torque being applied to the element being tightened is indicated by a suitable index dial upon the wrench.

The principal object of this invention is to provide a simple and highly efficient device for checking and testing torque wrenches of the above type to determine the accuracy of their torque indications, and to provide a device of this character which may be used, if desired, for calibrating torque wrench scales.

Another object of the invention is to so construct the device that it will occupy but a minimum of space in the shop, and so that it can be rigidly mounted in correct position on a wall or other fixed vertical support so as to maintain its accuracy, and so as not to occupy bench space in a shop.

A further object is to eliminate all springs and other mechanisms which may be subject to fatigue so that the improved testing device will remain permanently accurate, and to provide a tester in which the torque-indicating means will remain at the maximum position reached during a test until re-set by hand to facilitate accurate reading of the torque indications.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a front view of the improved torque wrench-testing device;

Fig. 2 is a right side view thereof; and

Fig. 3 is a horizontal section looking downwardly on the line 3—3, Fig. 1.

The improved torque-testing device is supported on a frame plate or casting 10 having a rearwardly turned, peripheral strengthening flange 30 and provided with tubular supporting legs 11. It is preferred to employ three of the legs 11 to provide a three-point support for the casting 10. The legs 11 are provided with closed bottoms 12 having central attachment bolt holes 13, and provided with leveling pads 43. The casting 10 is designed to be supported in a vertical plane from a wall or other vertical supporting surface by means of suitable bolts or lag screws passed through the bolt holes 13. The sides of the tubular legs 11 are slotted, as indicated at 42, to facilitate the insertion of the bolts therein.

The lower side edge of the casting 10 is formed with an arcuate contour along which an arcuate torque index scale 14 is secured. An arcuate open slot 15 is formed in the face of the casting 10 adjacent to, and concentric with, the scale 14, and an indented mechanism housing 17 is formed in the frame plate 10.

A cover plate 16 is secured over the housing 17 by means of suitable cap screws 18. A hollow input shaft 19 is mounted in suitable anti-friction bearings 20 in the cover plate 16, and in similar bearings 21 in the back of the housing 17. The input shaft 19 is formed with a non-circular stud opening 22 for receiving the wrench stud of the particular torque wrench being tested. A pendulum shaft 23 is also mounted in suitable anti-friction bearings 24 in the cover plate 16, and in similar bearings 25 in the back of the housing 17. The shafts 19 and 23 preferably lie in the same horizontal plane in parallel, spaced-apart relation.

The input shaft 19 carries a gear segment lever 26 which is fixedly secured to the shaft 19 in any desired manner, such as by means of a suitable key or by shrinking or welding. The free extremity of the lever 26 is provided with gear teeth 27 which engage the teeth of a pinion 28 formed or secured on the pendulum shaft 23. A pendulum hub block 41, carrying a pendulum arm 29, is mounted on the rear extremity of the shaft 23 behind the housing 17. The hub block 41 is fixed to the shaft 23 in any desired manner, such as by means of a suitable key and retaining nut 31. A pendulum weight 32 is supported on the lower extremity of the pendulum arm 29 by means of a suitable retaining pin 33, or in any other desired manner. The pendulum arm and the pendulum shaft are free to swing in the bearings 25 and 24, and the return swing of the arm is cushioned by means of a resilient bumper pad 40 mounted on the lowermost leg 11.

A pointer 35 is rotatably mounted on a cylindrical hub 36 projecting forwardly from the cover plate 16 and positioned concentrically with the axis of the pendulum shaft 23. The pointer is rotatably retained on the hub 36 by means of a hub plate 37 secured in place by means of suitable cap screws 38. A distorted, resilient friction washer 39 is clamped between the casting 10 and the pointer 35 by the action of the cap screws 38 and acts to maintain the pointer in frictional engagement with the hub plate 37 so as to support the pointer in any set angular position about the axis of the pendulum shaft 23.

In use, a wrench stud is interfitted into the stud opening 22 in the input shaft 19. A conventional torque wrench is then placed over the stud and rotated in a clockwise or tightening direction so as to rotate the input shaft 19 in a clockwise direction. This causes the segment lever to swing upwardly, the lever teeth 27 acting against the pinion 28 to rotate the pendulum shaft in a counter-clockwise direction. This causes the pendulum weight 32 to swing upwardly to the right, causing the pusher pin 34 to travel along the open slot 15, pushing the pointer 35 ahead of it, to indicate applied torque on the scale 14. The latter indications may be compared with the wrench indications to determine the accuracy of the wrench. When the wrench is released, the pendulum swings back to its normal "at rest" position. The pointer 35, however, remains at the maximum indication until returned by hand.

It is also conceivable that the pointer may be manually positioned at any desired position, and the wrenches could be tested by determining whether the pusher pin reaches the preset position of the pointer.

The scale 14 is preferably a sine scale, that is, the graduations increase in proportion to the increase in the sines of the angles defined by the departure of the pointer 35 from the vertical position.

It is desired to call attention to the compact arrangement provided for obtaining a large movement of the scale pointer with a small movement of the input shaft by the use of the relatively long gear segment lever 26. The scale movement is still further multiplied by the relatively great length of pointer 35 so that movement of the torque wrench is very slight for a full scale reading on the index scale 14. This multiplication of the distance traveled inversely reduces the amount of weight necessary on the pendulum so that a comparatively light, compact device is provided having sufficient torsional resistance for the largest wrenches.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A torque wrench-testing device comprising: a frame; a torque-indicating scale supported by said frame; means for supporting said frame in a vertical position; an input shaft rotatably mounted in said frame and provided with means for receiving a wrench; a pendulum shaft rotatably mounted in said frame in parallel, spaced relation to said input shaft; a toothed pinion fixed on said pendulum shaft; a lever arm fixed on said input shaft; an arcuate series of teeth in the extremity of said lever arm, said teeth being arranged concentrically of the axis of said input shaft and continuously meshing with the teeth of said pinion; a weighted pendulum affixed to, and suspended from, said pendulum shaft; a pointer mounted to rotate the axis of said pendulum shaft and extending to said indicating scale to indicate positions on the latter, said pendulum being positioned rearwardly of said frame, and said pointer being positioned forwardly thereof, there being an elongated, arcuate slot in said frame concentric with the axis of said pendulum; and a pusher pin mounted in said pendulum and projecting through said slot at one side of and in the path of said pointer to transmit the initial movement of said pendulum to said pointer.

2. A torque wrench-testing device comprising: a frame; a torque-indicating scale supported by said frame; means for supporting said frame in a vertical position; an input shaft rotatably mounted in said frame and provided with means for receiving a wrench; a pendulum shaft rotatably mounted in said frame in parallel, spaced relation to said input shaft; a toothed pinion fixed on said pendulum shaft; a lever arm fixed on said input shaft; an arcuate series of teeth in the extremity of said lever arm, said teeth being arranged on an arc concentric to the axis of said input shaft and continuously meshing with the teeth of said pinion; a weighted pendulum affixed to, and suspended from, said pendulum shaft; a pointer mounted to rotate about the axis of said pendulum shaft and extending to said indicating scale to indicate positions on the latter; means for transmitting the movement of said pendulum to said pointer as the former departs from a vertical position; a stationary hub supported by said frame concentric with the axis of said pendulum shaft, said pointer being rotatably mounted on said hub; a hub cap retaining said pointer on said hub; and resilient means urging said pointer against said cap to frictionally support said pointer.

3. A torque wrench-testing device comprising: a flat, vertical frame plate; supporting legs extending rearwardly from said frame plate for supporting and spacing the latter from a vertical surface; an input shaft rotatably mounted in said plate at right angles to the plane thereof and adjacent one upper corner of said plate; a pendulum shaft rotatably mounted in said plate adjacent the opposite upper corner thereof, the lower edge and one side of said plate being arcuately curved on an arc concentric with the axis of said pendulum shaft; an arcuate scale on the front face of said plate paralleling the arcuate edge thereof; an arcuate slot formed in said plate paralleling said scale; a segment gear lever fixed on said input shaft rearwardly of the plane of said plate and extending toward said pendulum shaft; gear teeth on the extremity of said gear lever, said teeth being positioned on an arc concentric with the axis of said input shaft; a pinion mounted on said pendulum shaft rearwardly of the plane of said plate, with its teeth in constant engagement with the teeth on said segment lever; a pendulum arm fixedly mounted on said pendulum shaft and depending therefrom; a pendulum weight mounted on said pendulum arm between the plane of said plate and said supporting surface; a pusher pin mounted in and extending forwardly from said pendulum weight through said arcuate slot and forwardly from said plate; a stationary, cylindrical hub projecting forwardly from said plate concentric of the axis of said pendulum arm; a pointer rotatably mounted on said cylindrical hub and extending radially therefrom across said arcuate slot to a position adjacent said scale; a friction device positioned between said plate and said pointer; and a hub plate maintaining said pointer against said friction device, the bias to rotate said pointer being obtained by contact of said pusher pin therewith.

4. A torque wrench-testing device as described in claim 3 in which said plate has a rearwardly indented mechanism housing formed therein and surrounding said segment lever; and a cap plate closing the forward face of said mechanism housing, said input shaft and said pendulum shaft being journalled in said cap plate.

EDWARD THORNE ABLE.

References Cited in the file of this patent

UNITED STATES PATENTS

| Number | Name | Date |
| --- | --- | --- |
| 1,147,400 | Hutchinson | July 20, 1915 |
| 1,423,842 | Elmendorf | July 25, 1922 |
| 1,781,615 | Von Leesen | Nov. 11, 1930 |
| 2,283,888 | Zimmerman | May 19, 1942 |
| 2,486,632 | Burke et al. | Nov. 1, 1949 |